US012625020B2

(12) United States Patent
Williams et al.

(10) Patent No.: US 12,625,020 B2
(45) Date of Patent: May 12, 2026

(54) PHOTONIC SHOCK AND IMPULSE (PSI) GAUGE

(71) Applicant: Analex Corporation, Chantilly, VA (US)

(72) Inventors: George Williams, Colorado Springs, CO (US); Todd Evan Vande Brake, Peyton, CO (US); Gary Lee Paderewski, Colorado Springs, CO (US)

(73) Assignee: Analex Corporation, Chantilly, VA (US)

( * ) Notice: Subject to any disclaimer, the term of this patent is extended or adjusted under 35 U.S.C. 154(b) by 379 days.

(21) Appl. No.: 18/481,276

(22) Filed: Oct. 5, 2023

(65) Prior Publication Data

US 2025/0116558 A1 Apr. 10, 2025

(51) Int. Cl.
| | |
|---|---|
| G01L 1/24 | (2006.01) |
| G01H 9/00 | (2006.01) |
| G01P 3/52 | (2006.01) |
| G01D 5/00 | (2006.01) |

(52) U.S. Cl.
CPC .................. G01L 1/24 (2013.01); G01P 3/52 (2013.01); *G01D 5/00* (2013.01); *G01H 9/00* (2013.01); *G01H 9/006* (2013.01)

(58) Field of Classification Search
CPC .... G01L 1/24; G01P 3/52; G01H 9/00; G01H 9/006; G01D 5/00; G01D 5/268; G01D 5/35312; G01D 5/266
See application file for complete search history.

(56) References Cited

U.S. PATENT DOCUMENTS

| | | | | |
|---|---|---|---|---|
| 9,395,511 | B1 * | 7/2016 | Code ........................ | G02B 7/08 |
| 10,018,646 | B2 * | 7/2018 | Cranch ................. | G01D 5/268 |
| 2005/0195403 | A1 * | 9/2005 | Xu ........................ | G01D 5/268 |
| | | | | 356/480 |
| 2006/0208842 | A1 * | 9/2006 | Maerky .................... | F01L 9/20 |
| | | | | 335/302 |
| 2025/0237546 | A1 * | 7/2025 | Vande Brake .......... | C08L 33/12 |

OTHER PUBLICATIONS

Patrick C. Rose, et al.; "Impulse Gage Development for the 100-200 Ktap Range"; Advanced Technologies Division; General Research Corporation; Jul. 31, 1990; pp. 1-105.

(Continued)

*Primary Examiner* — Peter J Macchiarolo
(74) *Attorney, Agent, or Firm* — Morrison & Foerster LLP

(57) ABSTRACT

An apparatus for measuring movement of a test specimen, where the apparatus includes an electromagnetic transducer and an optical probe. The apparatus may include a test specimen holder and a body that move together. The optical probe may be configured to direct an optical beam through the body to the test specimen, which may provide for measurement of a prompt impulse. The electromagnetic transducer may be configured to produce a voltage when the test specimen holder and the body move, which may provide for measurement of a total impulse of the same test specimen. Thus, a single gauge may provide for measuring both prompt impulse and total impulse of the same test specimen.

20 Claims, 11 Drawing Sheets

(56) References Cited

OTHER PUBLICATIONS

Tommy Ao, et al.; "SIRHEN: a data reduction program for photonic Doppler velocimetry measurements"; Sandia Report; Sandia National Laboratories; Jun. 2010; pp. 1-66.

Daniel H. Dolan; "THRIVE: a data reduction program for three-phase PDV/PDI and VISAR measurements"; Sandia Report; Sandia National Laboratories; Jun. 2008; pp. 1-51.

Charles E. Needham; "Blast Waves"; Shock Wave and High Pressure Phenomena; Energetics Technology Center; Mar. 2010; pp. 1-30.

Jerry W. Forbes; "Shock Wave Compression of Condensed Matter"; Energetics Technology Center; Shock Wave and High Pressure Phenomena; Springer-Verlag Berlin Heidelberg 2012; pp. 1-380.

* cited by examiner

132

130

12

128

134

16

PSI Gauge Electromagnetic Transducer Output

PHOTONIC SHOCK AND IMPULSE (PSI) GAUGE

STATEMENT OF GOVERNMENTAL INTEREST

This invention was made with Government support under Contract Nos. N00030-20-C-0014 and N00030-15-C-0029 awarded by the United States Navy/Strategic Systems Programs. The U.S. Government has certain rights in the invention.

TECHNICAL FIELD

The present disclosure relates generally to measurement devices and, in particular, as a photonic shock and impulse gauge for measuring a prompt impulse and a total impulse in thermally mechanically induced shock environments, and a method of using the shock and impulse gauge.

BACKGROUND

Prompt impulse and total impulse loading on test specimens from an X-ray test environment (or an ionic or direct laser impulse test environment) may be measured by two separate gauges (i.e., one for prompt impulse and another for total impulse), with one test specimen provided in one gauge and a different identical specimen provided in the other gauge. The volume available (e.g., at the National Ignition Facility (NIF) at Lawrence Livermore National Labs) for placing test specimens and instrumentation is limited. In addition, there is a limited amount of time available for testing, and test time can be expensive. Moreover, because each of the two identical test specimens are provided in a different gauge, in practice the test specimens may have different masses during testing (e.g., due to laser ablation of mass of each test specimen during testing) which may invalidate test results.

Accordingly, a process and device are needed to reduce testing space and testing time required to measure prompt impulse and total impulse of test specimens in, for example, an X-ray test environment. Moreover, a process and device are needed to reduce or eliminate differences that may occur between the test specimen that is provided for prompt impulse measurement and the counterpart test specimen provided for total impulse measurement.

SUMMARY

The present application provides for an apparatus for measuring movement of a test specimen, where the apparatus includes an electromagnetic transducer and an optical probe. The apparatus may include a test specimen holder and a body that move together. The optical probe may be configured to direct an optical beam through the body to the test specimen, which may provide for measurement of a prompt impulse. The electromagnetic transducer may be configured to produce a voltage when the test specimen holder and the body move, which may provide for measurement of a total impulse of the same test specimen. Thus, a single gauge may provide for measuring both prompt impulse and total impulse of the same test specimen.

For example, the optical probe may provide for determining the prompt impulse based on a displacement (e.g., over time from a vibration due the shockwave that propagates through the test specimen) of the test specimen measured by the optical probe when the shockwave propagates through the test specimen. The electromagnetic transducer may provide for determining the total impulse based on a velocity of the test specimen determined based on the voltage produced by the electromagnetic transducer based on movement of the body, after measurement by the optical probe has completed (e.g., after the shockwave has stopped propagating through the test specimen).

Thus, a single apparatus may provide for measuring both a prompt impulse and a total impulse. The apparatus may be a gauge (e.g., a photonic shock and impulse (PSI) gauge). The gauge may include a single transducer housing that houses both at least a portion of the electromagnetic transducer and at least a portion of the optical probe. The gauge may advantageously provide for measurement from both the electromagnetic transducer and the optical probe during the same test of the test specimen. Therefore, the gauge may provide for prompt impulse and total impulse in less time and with less required testing space (e.g., half as much testing space) compared to conducting two different tests with two separate gauges (e.g., one for prompt impulse and another for total impulse).

As discussed above, since both prompt impulse and total impulse may be measured for the same test specimen, there may be no variability (or an insignificantly small variability) of the mass of the test specimen when prompt impulse is measured compared to when the total impulse is measured. Thus, a more accurate material model may be generated based on the measured prompt impulse and the measured total impulse of the test specimen, compared to testing methods that require a different test specimen for each measurement.

Moreover, because both measurements can be provided taken from a single test specimen, only half the number of test specimens is required compared to testing methods that require a different test specimen for each measurement. Thus, material costs for providing prompt impulse and total impulse may be reduced compared to testing methods that require a different test specimen for each measurement.

The gauge may be used in atmospheric, vacuum, or other pressure conditions. The gauge housing may include mounting features, such as threaded mounting holes, to attach the gauge housing to a test mount.

The gauge may be configured to measure impulse anywhere from 50 taps to 10 ktaps (i.e., 5 pascal-seconds (Pa·s) to 1,000 Pa·s), for example anywhere from 800 taps to 6.8 ktaps (i.e., 80 Pa·s to 680 Pa·s), which has been achieved in practice.

According to an embodiment of the present disclosure, an apparatus for measuring movement of a test specimen may include a transducer housing. The apparatus may include a test specimen holder that is configured to hold the test specimen and configured to move relative to the transducer housing when the test specimen moves relative to the transducer housing. The apparatus may include a body that is fixed relative to the test specimen holder such that the body moves with the test specimen holder, relative to the transducer housing, the test specimen translates relative to the transducer housing. The apparatus may include an electromagnetic transducer configured to produce a voltage when the test specimen holder and the body move relative to the transducer housing. The apparatus may include an optical probe configured to direct an optical beam through the body to the test specimen.

According to another embodiment of the present disclosure, a method of measuring movement of a test specimen may include holding test specimen in a test specimen holder. The method may include directing an optical beam from an optical probe through a body, that is fixed relative to the test specimen holder, to the test specimen. The method may include producing a shockwave that propagates through the test specimen such that the optical probe measures displacement of the test specimen due to the shockwave. The method may include producing a voltage with an electromagnetic transducer based on movement of the body with the test specimen in a first direction relative to the transducer housing.

Any of the features of the above and below disclosed embodiments of the gauge may be used in combination with one another.

BRIEF DESCRIPTION OF THE DRAWINGS

The foregoing summary, as well as the following detailed description of illustrative embodiments of the gauge of the present application, will be better understood when read in conjunction with the appended drawings. For the purposes of illustrating the apparatus of the present application, there is shown in the drawings illustrative embodiments. It should be understood, however, that the application is not limited to the precise arrangements and instrumentalities shown. In the drawings.

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Figure 1:
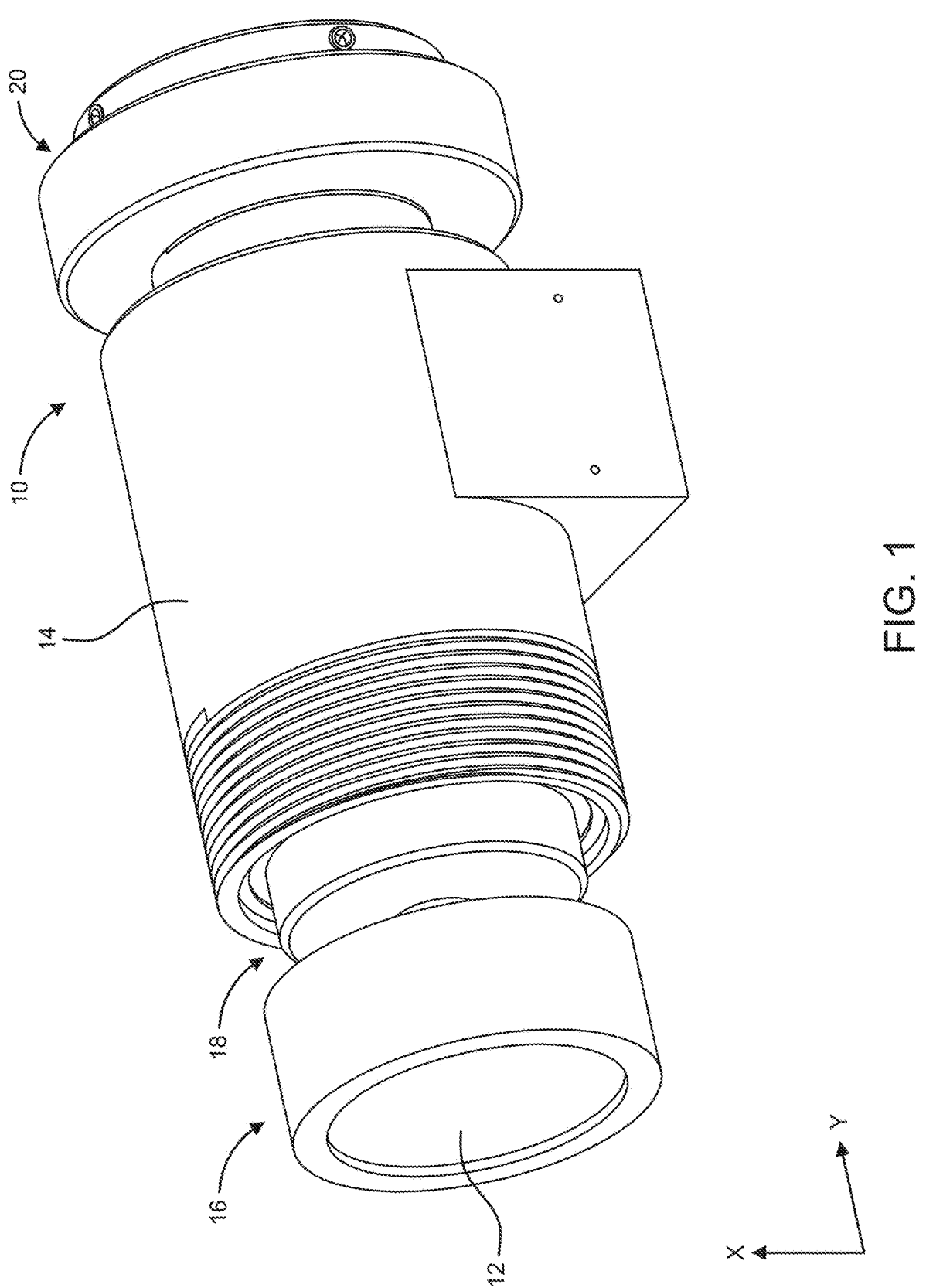
FIG. 1 is an oblique side view of a gauge.

Referring to FIG. 1, a gauge 10 (an example of an apparatus) for measuring movement of a test specimen 12 is illustrated. The gauge 10 may be a shock and impulse gauge for measuring a prompt impulse and a total impulse loading on the test specimen 12, as discussed below. The gauge 10 may include a gauge housing 14, a test specimen holder 16, a measurement assembly 18 disposed at least partially within the gauge housing 14, and a shock isolation system 20.

Figure 2A:
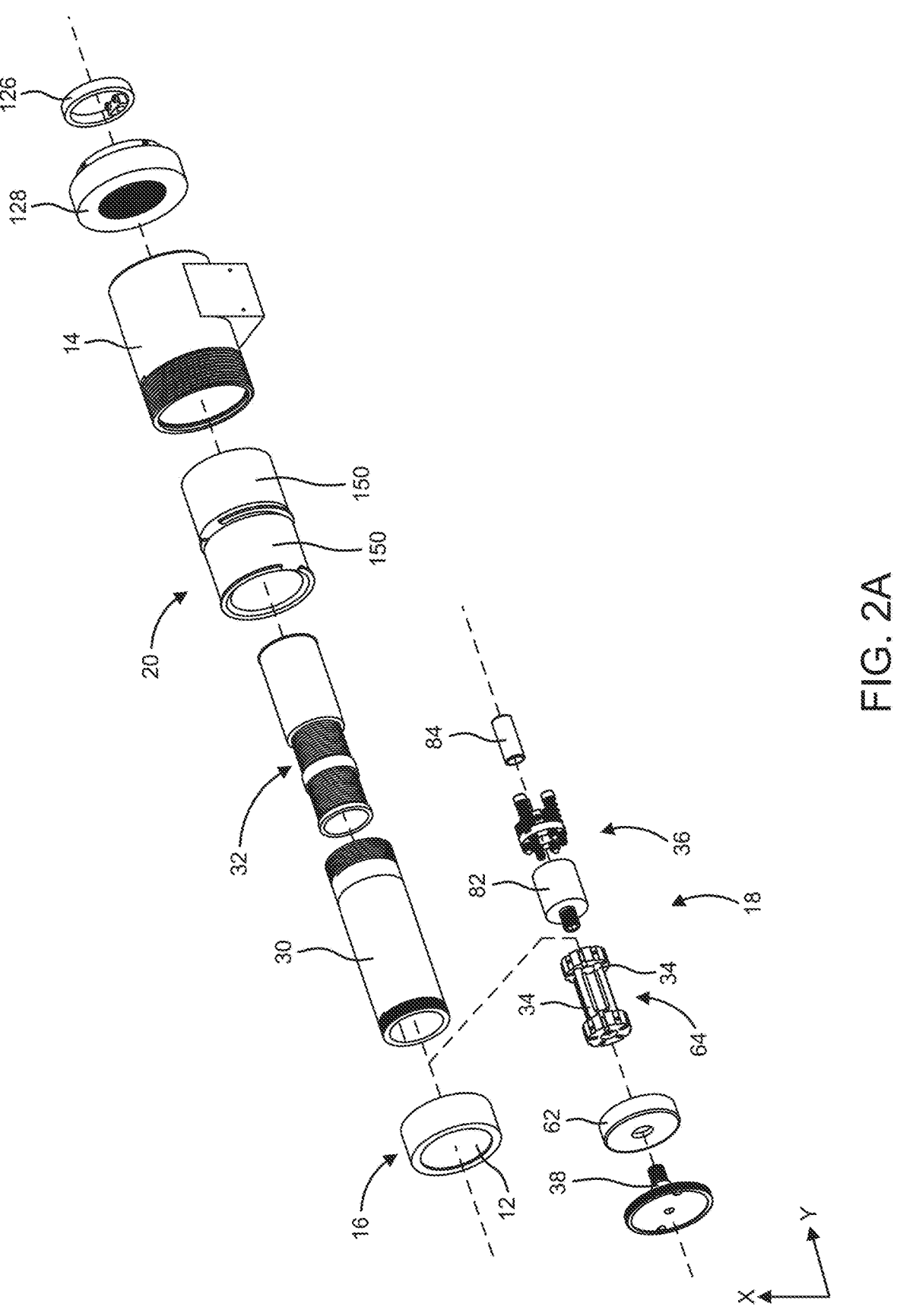
FIG. 2A is an exploded oblique side view of the gauge of FIG. 1, including an electromagnetic transducer and an optical probe assembly.
Figure 3A:
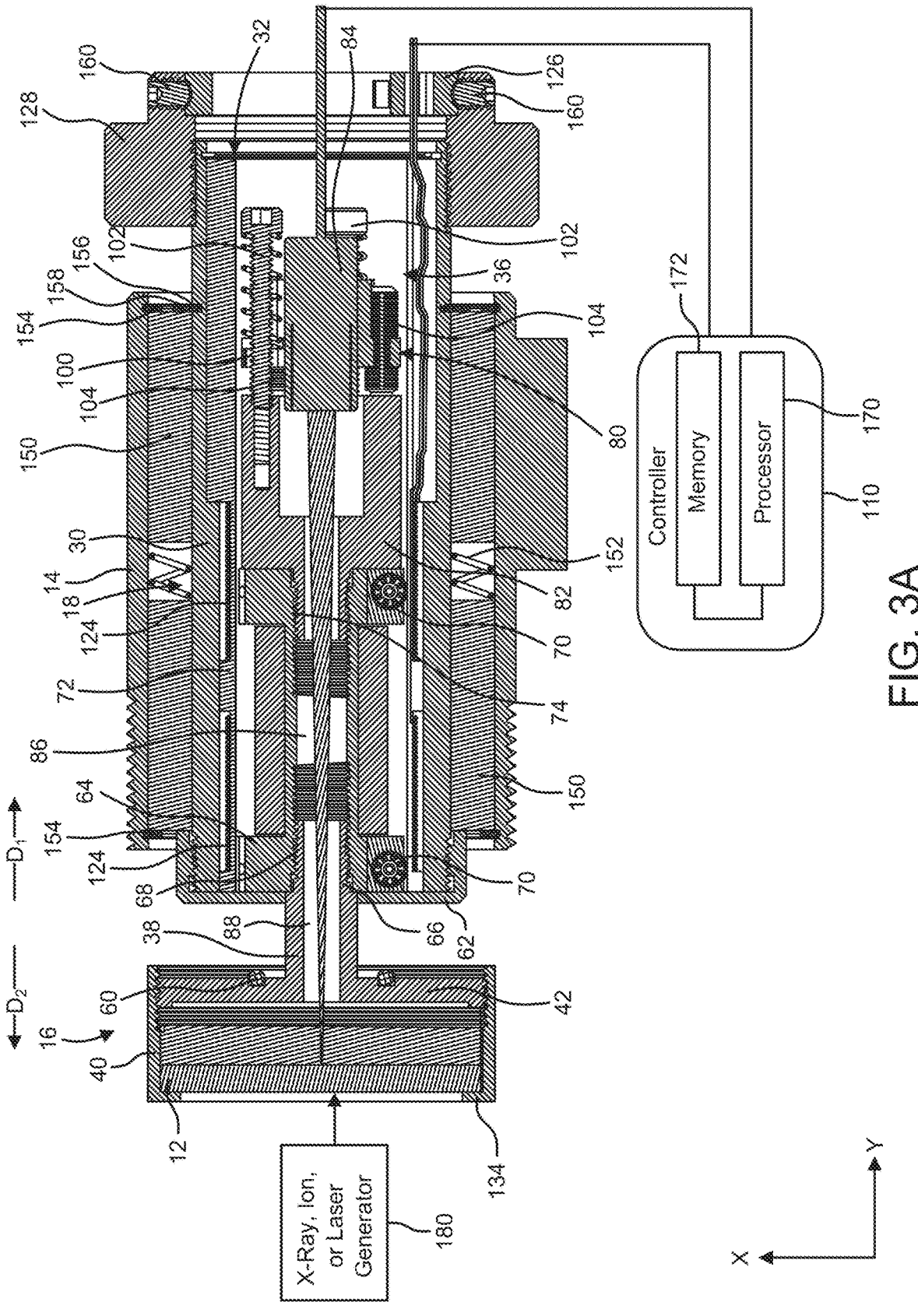
FIG. 3A is a side cross-sectional view of the gauge of FIG. 1 in a first position prior to testing.
Figure 3B:
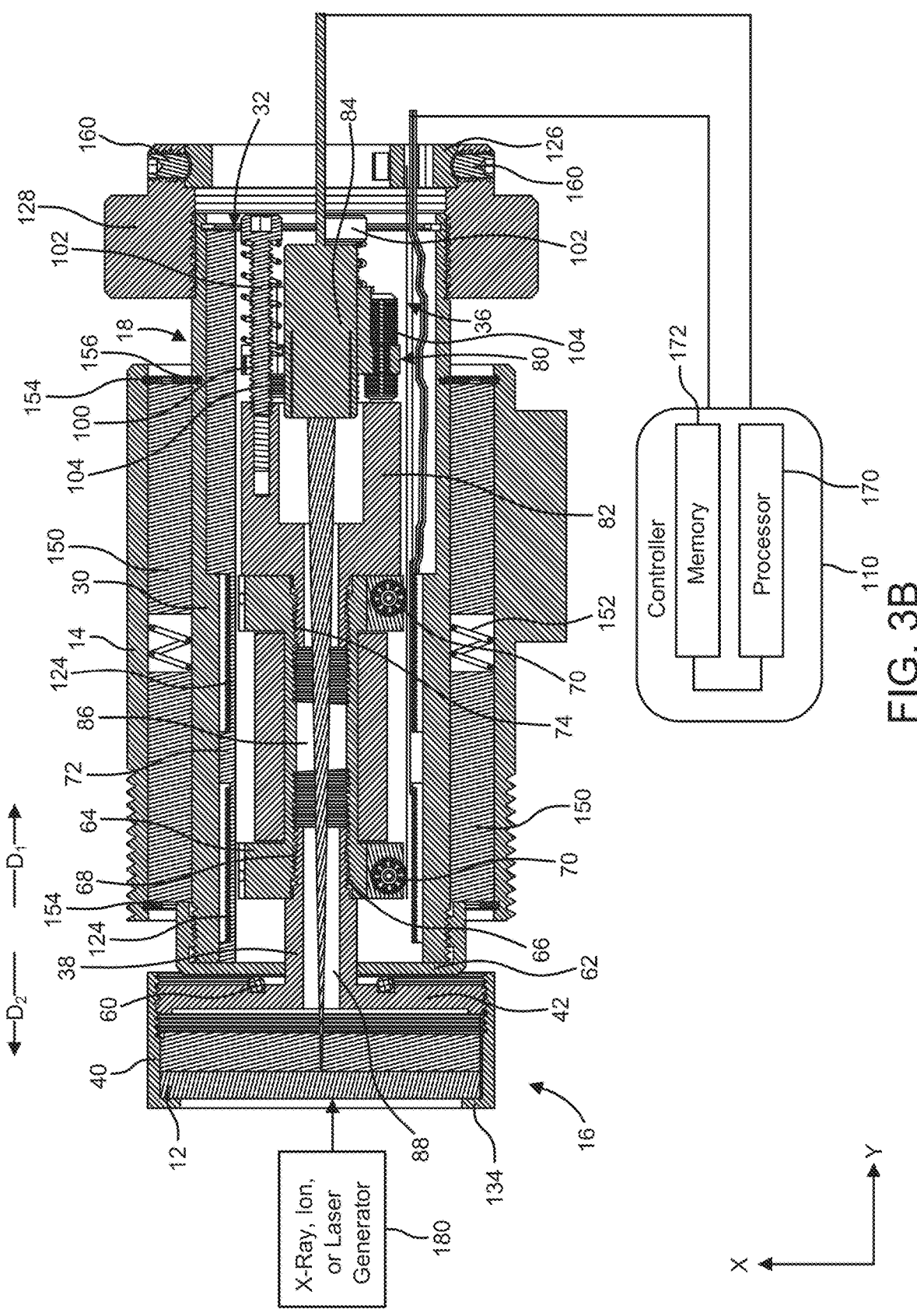
FIG. 3B is a side cross-sectional view of the gauge of FIG. 1 in after a shockwave has propagated through a test specimen held by the test specimen holder, and after the test specimen holder translates rearward.

Turning to FIGS. 2A, 3A, and 3B, the measurement assembly 18 may include a transducer housing 30, a coil assembly 32, one or more magnets 34, an optical probe assembly 36, and a pedestal 38 (an example of a body). The coil assembly and the one or more magnets 34 may together form an electromagnetic transducer, such that when the one or more magnets 34 move relative to the coil assembly 32, the coil assembly 32 may produce a voltage based on such movement. The optical probe assembly 36 may be configured to direct an optical beam to the test specimen 12.

Referring to FIGS. 3A and 3B, the pedestal 38 may be configured to move with the test specimen holder 16. For example, the pedestal 38 may be fixed relative to the test specimen holder 16. When the test specimen 12 is held in place by being sandwiched between a holder body 40 of the test specimen holder and a front plate 42 of the pedestal 38, the entire pedestal 38 and the entire test specimen holder 16 may be translationally fixed relative to the test specimen 12.

The test specimen holder 16 may include the front plate 42 of the pedestal 38. The front plate 42 may form a portion of the test specimen holder 16, such that the pedestal 38 forms at least a portion of the test specimen holder 16. The front plate 42 may be configured to face toward the test specimen 12. For example, the holder body 40 may be configured to couple to the front plate 42 to sandwich the test specimen in place relative to the pedestal when in a locked configuration, as exemplified in FIG. 3A. Thus, the pedestal 38 may be integral with at least a portion of the test specimen holder 16.

The pedestal 38 may comprise damper element 60, such as an O-ring. The damper element 60 may be configured to dampen an impact between the pedestal 38 and the transducer housing 30 (e.g., an endcap 62 of the transducer housing 30). For example, the damper element 60 may be configured to engage the transducer housing 30 when the pedestal 38 moves in a first direction $D_1$ from an initial position shown in FIG. 3A to a final position shown in FIG. 3B.

The test specimen holder 16 and the pedestal 38 may be configured to move relative to the transducer housing 30. For example, the pedestal 38 may be fixed relative to a bearing carriage 64 (an example of a transducer bearing that forms an example of a body) of the measurement assembly 18 may be configured to translate along a longitudinal axis Y relative the transducer housing 30. The bearing carriage 64 may be disposed within the transducer housing 30 and disposed within the coil assembly 32. A lateral axis X may be perpendicular to the longitudinal axis Y.

The bearing carriage 64 may form a portion of the electromagnetic transducer. For example, the one or more magnets 34 may be fixed to the bearing carriage 64 such that the one or more magnets 34 and the bearing carriage 64 are movable together along the first direction $D_1$ and the second direction $D_2$. The one or more magnets 34 may not be movable relative to the bearing carriage 64.

The pedestal 38 may be fixedly engaged to the bearing carriage 64. For example, the pedestal 38 may include a threaded shaft 66 that threadedly couples to a first threaded end 68 of the bearing carriage 64. When coupled to the first threaded end 68, the threaded shaft 66 may be disposed within the first threaded end 68.

The pedestal 38 may extend along the first direction $D_1$ through the endcap 62 of the transducer housing 30 such that the threaded shaft 66 is disposed within the transducer housing 30 to couple to the first threaded end 68. Thus, the endcap 62 may circumscribe at least a portion of the pedestal 38.

The front plate 42 may be exterior of the transducer housing 30, spaced from the threaded shaft 66 in the second direction $D_2$. The longitudinal distance between the front plate 42 and the endcap 62 when the test specimen holder 16 is in its initial position in FIG. 3A may be the stroke distance that the test specimen holder 16 moves from its initial position to its final position in FIG. 3B.

Turning to FIGS. 2D, 2E, 3A, and 3D, the bearing carriage 64 may include a plurality of ball bearings 70 that are configured to allow the bearing carriage 64 to translate along the longitudinal axis Y relative to the transducer housing 30. For example, the ball bearings 70 may by rotatable and be circumferentially spaced about the longitudinal axis Y such that the ball bearings 70 engage with an inner surface of a coil tube 72 (FIG. 3A) of the coil assembly 32.

The optical probe assembly 36 may be at least partially fixed relative to the test specimen holder 16. For example, the optical probe assembly 36 may be fixed relative to the bearing carriage 64, which may be fixed relative to the pedestal 38. The bearing carriage 64 may include a second threaded end 74 that threadedly couples to a threaded portion of the probe adjuster base 82 of the optical probe assembly 36. Thus, the optical probe assembly 36 may be configured to move relative to the transducer housing 30 with the pedestal 38 and the test specimen holder 16.

The optical probe assembly 36 may include a probe adjuster 80, a probe adjuster base 82, and an optical probe 84 configured to direct the optical beam to the test specimen 12. For example, the optical beam may be directed through an opening 86 (FIGS. 3A and 3B) of the bearing carriage 64 and an opening 88 (FIGS. 3A and 3B) of the pedestal 38.

The optical beam produced by the optical probe 84 may be a laser beam. For example, the optical probe assembly 36 may be configured to connect to an infrared laser, or configured to produce an infrared laser beam, an ultraviolet laser beam, an X-ray laser beam, or a gamma-ray laser beam.

The optical probe adjuster 80 may be configured to adjust focus and/or tip tilt of the optical probe 84. For example, the optical probe adjuster 80 may include an adjuster body 100 that is configured to hold the optical probe 84. The optical probe adjuster 80 may include three spring loaded screws 102 that are configured to threaded engage with complementary threading of the probe adjuster base 82. For example, the spring loaded screws 102 may at least partially fix the optical probe to the probe adjuster base 82. The spring loaded screws 102 may resist movement of the adjuster body 100 in the second direction $D_2$ such that spring loaded screws resist movement of the optical probe 84 in the second direction $D_2$. In an embodiment, the optical probe adjuster includes less than three spring loaded screws. In another embodiment, the optical probe adjuster includes more than three spring loaded screws.

The optical probe adjuster 80 may include three set screws 104 (e.g., three ball end set screws) that are configured to adjust the position of the adjuster body 100 along the longitudinal axis Y and/or configured to adjust an angle of the adjuster body 100 relative to the longitudinal axis Y. For example, the set screws 104 may threadedly engage with the adjuster body 100 and abut the probe adjuster base 82. Rotation of one of the set screws 104 in a first rotational direction may move a corresponding portion of the adjuster body 100 and the optical probe 84 in the first direction $D_1$ and rotation of one or more of the set screws 104 in a second rotational direction may move the corresponding portion of the adjuster body 100 and the optical probe 84 in the second direction $D_2$. Thus, the distance from the test specimen 12 and/or the angle relative to the longitudinal axis Y, of the optical probe 84 and its optical beam, may be adjusted with the set screws 104. In an embodiment, the optical probe adjuster includes less than three set screws (e.g., one or two set screws). In another embodiment, the optical probe adjuster includes more than three set screws.

The optical probe may include an optic line configured to transmit data from the optical probe to a controller 110. For example, the optical probe may be a fiber optic laser probe that is operably coupled to an external laser source through a fiber optic cable the exits out a back end of the transducer housing 30.

Turning to FIGS. 2A, 2C, 3A, and 3B, the gauge housing 14 may circumscribe at least a portion of the transducer housing 30. For example, most of the transducer housing 30 may be disposed within the gauge housing 14. In an embodiment less than half of the transducer housing is disposed within the gauge housing. In another embodiment, more than half of the transducer housing is disposed within the gauge housing.

The gauge housing 14 may include one or more mounting holes 122 (FIG. 2C) to attach the gauge housing 14 to a test mount (not shown). For example, the gauge housing 14 may include four M3×0.5-6H threaded holes in its base. The gauge housing 14 may additionally or alternatively include a different mounting interface, for example, that includes 1 11/16-18 UNEF-2A external threading 123.

Turning to FIGS. 3A and 3B, the coil assembly 32 may include coil windings 124. The coil windings 124 may be configured to produce the voltage based on the movement of the magnets 34. For example, the coil windings 124 may be wrapped around the coil tube 72 of the coil assembly 32 that the bearing carriage 64 may be disposed within. The voltage may be based on the velocity of the test specimen 12 (e.g., velocity of the pedestal 38), in response to the motivating event after the shockwave has propagated through the test specimen 12. Thus, movement of the test specimen holder 16 with the measurement assembly 18 may result in production of the voltage.

In an embodiment, the coil windings 124 form a pair of copper wound coils. In another embodiment, the coil windings 124 form more than one pair of copper wound coils.

The coil windings 124 may exit the back end of the transducer housing 30 to operably connect to the controller 110, which may record the measurements from the coil windings 124. For example, the coil windings 124 may exit through a strain relief 126 that may be fixed relative to the transducer housing 30. The strain relief may be coupled to a shock isolation weight 128, which is discussed further below. In an embodiment, the coil windings operably connect with external recording equipment.

Referring now to FIGS. 2A, 2B, 3A, and 3B, the test specimen holder 16 may be configured to hold the test specimen 12 after the motivating event (e.g., when a shockwave propagates through the test specimen 12 and, afterwards, when the test specimen 12 translates rearward). Thus, the test specimen holder 16 may be configured to move with the test specimen 12 relative to the transducer housing 30 when the test specimen 12 translates rearward. For example, the test specimen holder 16 may be configured to move in the first direction $D_1$ relative to the transducer housing 30.

The test specimen holder 16 may include an opening in the holder body 40 that the optical beam is configured to pass through such that the optical beam is able to reach the test specimen. For example, the holder body 40 may define a cylindrical through hole that is configured to receive the front plate 42. The front plate may threadedly couple to the holder body 40 inside the through hole.

Figure 2B:
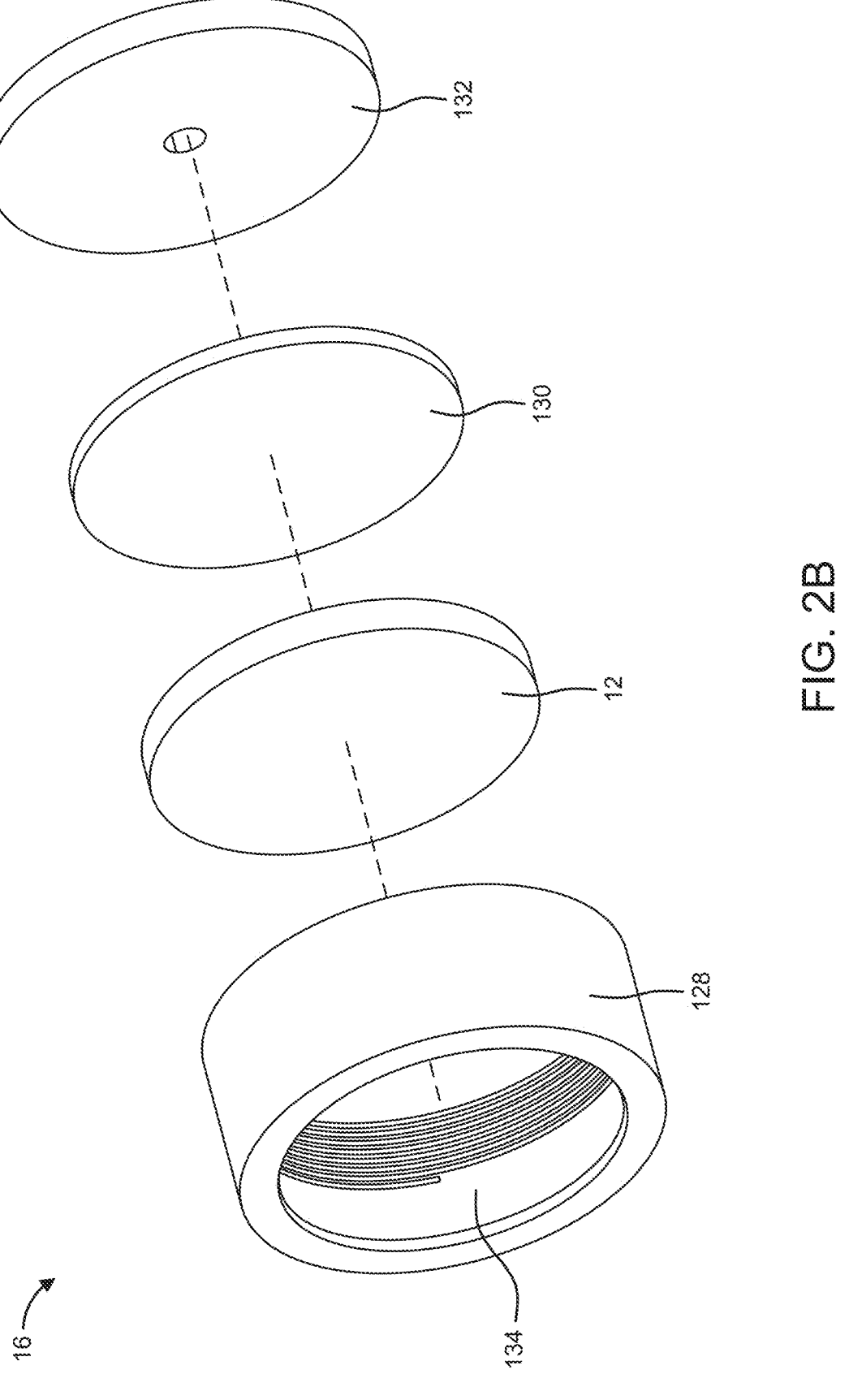
FIG. 2B is an exploded oblique side view of a test specimen holder and a test specimen of FIG. 1.
Figure 2C:
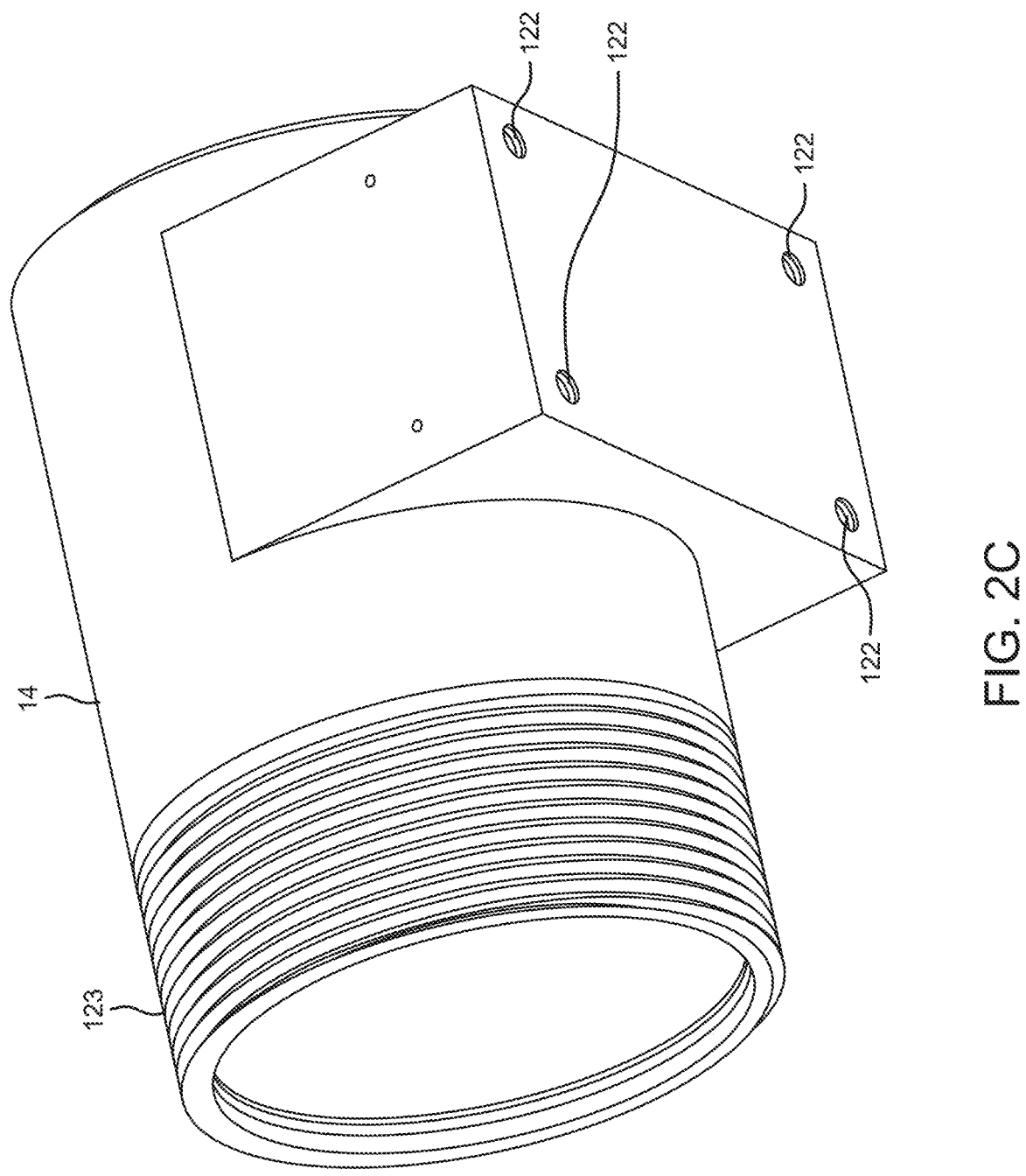
FIG. 2C is an oblique side view of a gauge housing of the gauge of FIG. 1.
Figure 2D:
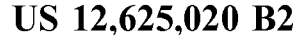
FIG. 2D is an oblique side view of a bearing carriage and the optical probe assembly of the gauge of FIG. 1.
Figure 2E:
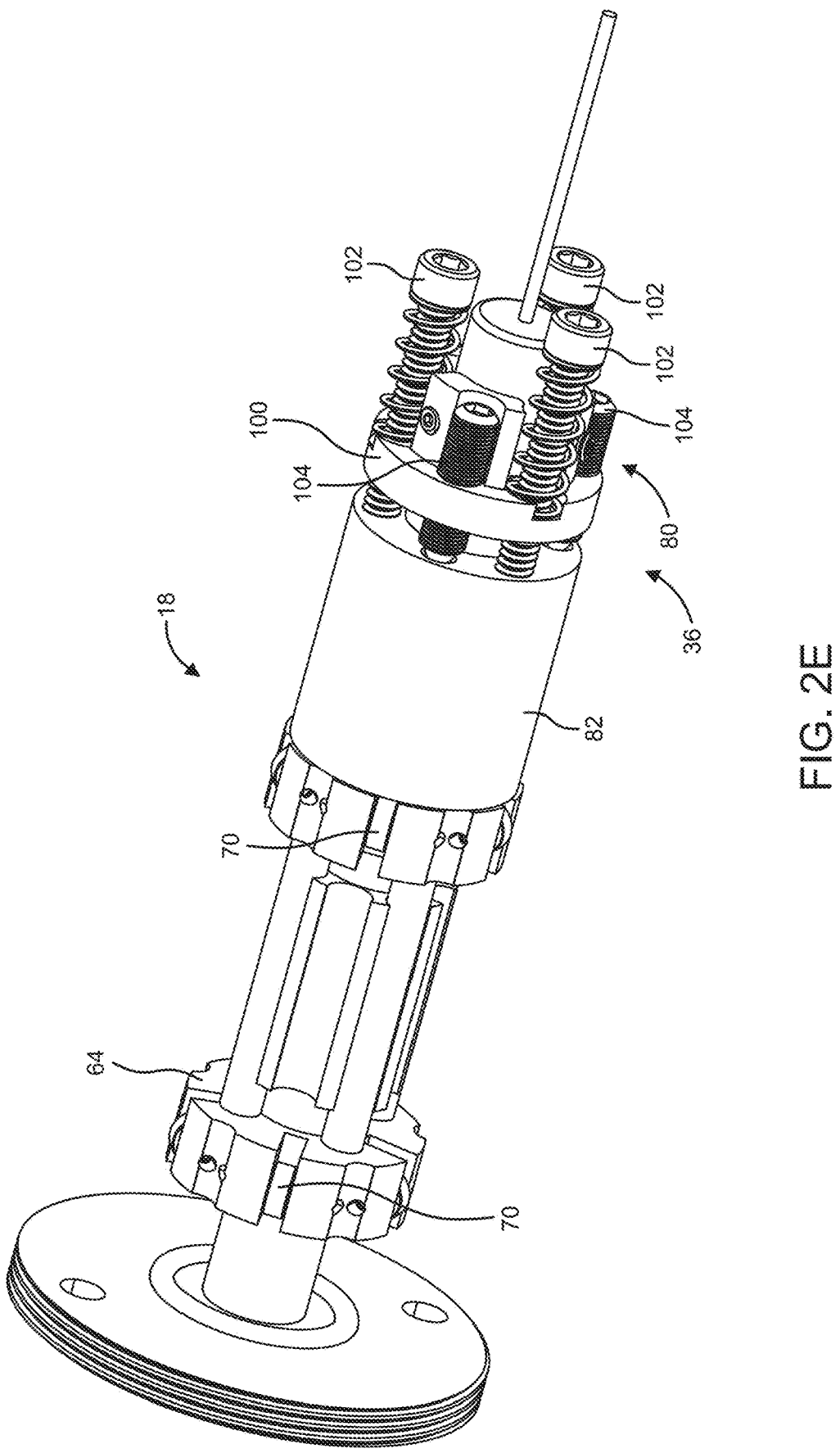
FIG. 2E is an oblique view of another side of the bearing carriage and the optical probe assembly of the gauge of FIG. 1.

The test specimen holder 16 may include a window 130 (FIG. 2B). For example, the window may be transparent and disposed between the test specimen 12 and the pedestal 38. The window 130 may be plate shaped and configured to be sandwiched between the test specimen 12 and the pedestal 38. In an embodiment, the window is not included.

The test specimen holder 16 may include a weight 132 (FIG. 2B). The weight 132 may be specified to control the velocity of the measurement assembly 18 (e.g., to within a predetermined range). The weight 132 may include an opening that the optical beam is configured to pass through. The weight 132 may be plate shaped and configured to be sandwiched between the test specimen 12 and the pedestal 38 (e.g., abutting the window 130 or the test specimen 12). In an embodiment, the weight 132 is not included. In another embodiment, more than one weight is provided between the test specimen and the pedestal.

The test specimen holder 16 may be disposed entirely outside of the transducer housing 30. For example, the entire holder body 40 and front plate 42 of the pedestal 38 may be spaced from the transducer housing 30 along the second direction $D_2$.

The test specimen 12 may be disc shaped such that a radially outer portion of the disc is configured to be sandwiched between the test specimen holder 16 and the pedestal 38 such that the test specimen 12 remains held in place relative to the pedestal 38. For example, the holder body 40 may include a radially inwardly extending shoulder 134 at its front end to abut the radially outer portion of the test specimen 12. In some embodiments, the test specimen has another shape that is configured to be held by the test specimen holder.

Turning to FIGS. 2A, 3A, and 3B, the shock isolation system 20 may be configured to shock isolate the gauge housing 14 from the test specimen holder 16 and the measurement assembly 18. For example, the shock isolation system 20 may isolate the translating components from facility machine shock that may couple into the gauge 10 through the gauge housing 14. The shock isolation system 20 may include the shock isolation weight 128 and a pair of linear bearings 150 that are separated by a dampening member 152 (e.g., a cylindrical coil spring).

The shock isolation weight 128 may be fixed relative to the transducer housing 30. For example, the shock isolation weight 128 may be threadably coupled to the transducer housing 30.

Referring only to FIGS. 3A and 3B, the shock isolation system 20 may include a retaining ring 154 at each end of the gauge housing 14 such that the linear bearings 150 are constrained from moving along the longitudinal axis outside of the gauge housing 14. For example, the retaining rings 154 may each engage a radially inwardly facing groove of the gauge housing 14 and may be configured to abut a corresponding one of the linear bearings 150.

A radially inner retaining ring 158 may be aligned with one of the retaining rings 154 (e.g., the rearwardly disposed retaining ring 154) and configured to engage a radially outwardly facing groove 156 of the transducer housing 30. The radially inner retaining ring 158 may be configured to abut a rearward facing surface of the rearwardly most disposed linear bearing 150, such that the linear bearings 150 are disposed between the radially inner retaining ring 158 and the endcap 62. Thus, the linear bearings 150 may absorb shock from the gauge housing 14.

The shock isolation weight 128 may include set screws 160 that fix the strain relief 126 relative to the shock isolation weight. In an embodiment, the strain relief is fixed to the shock isolation weight in another suitable manner (e.g., by threading, adhesive, etc.).

Referring to FIGS. 3A and 3B, the controller 110 may be operably coupled to the optical probe 36 and the coil assembly 32. The controller 110 may include a processor 170 operatively connected to memory 172.

The processor 170 may be configured to determine prompt impulse based on a displacement of the test specimen measured by the optical probe 84 when the shockwave propagates through the test specimen 12.

The processor 170 may be configured to determine total impulse based on a velocity of the test specimen 12 determined based on the voltage produced by the coil assembly 32 when the test specimen 12 and the test specimen holder 16 translate rearward. For example, the processor 170 may use interferometry to determine the prompt impulse based on the optical beam directed to the test specimen 12.

The controller 110 may be configured to send and/or receive signals to receive information from or direct operation of the one or more components of the gauge 10. For example, the controller 110 may be configured to receive data from the coil assembly 32 and from the optical probe assembly 36. The controller 110 may be configured to store information received from the coil assembly 32 and/or from the optical probe assembly 36, for example, in the memory 172.

The controller 110 may include, or be operatively connected to, one or more sensors configured to detect and measure various other parameters of the gauge 10.

The processor 170 may be configured to connect with and communicate with the memory 172, which may be configured to receive and store the measured values. The memory 172 may include a random access memory (RAM) and/or a computer-readable storage medium, such as a read-only memory (ROM) or non-volatile RAM (NVRAM), for storing basic routines for starting and/or operating the processor 170, which may be configured as a controller, and/or another component of the gauge 10 and to transfer information between the various components and devices of the gauge 10. The memory 172 may also store other software components necessary for the operation of the processor 170 and/or other components of the gauge 10 including an operating system, software implementing a cleaning method as described herein, and/or the like. The processor 170 may include, or may be connected to, or otherwise in communication with, computer-readable storage media to store and retrieve information, such as program modules, data structures, or other data. It should be appreciated by those skilled in the art that computer-readable storage media may be any available media that provides for the storage of non-transitory data and that may be accessed by the processor 170. By way of non-limiting example, the computer-readable storage media may include volatile and non-volatile storage media, transitory computer-readable storage media, non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

Referring to FIGS. 3A and 3B, prior to testing of a specimen 12, the focus and/or tip tilt of the optical probe 84 may be adjusted with the optical probe adjuster 80 to target the test specimen 12. For example, one or more of the set screws 104 of the optical probe adjuster 80 may be rotated to adjust the optical probe 84 such that the optical beam is directed to the test specimen 12.

During use of the gauge 10, a motivating event may result in the shockwave propagating through the test specimen 12, and then may result in translation of the test specimen 12. For example, an energy generator 180 may direct energy to the test specimen 12. For example, X-ray energy, ion energy, or laser energy may be generated by an X-ray generator, an ion generator, or a laser generator and directed to the front of the test specimen 12, thereby producing a shockwave to propagate through the test specimen 12. The X-ray energy, ion energy, or laser energy may continue to be directed to the front of the test specimen 12 after the shockwave has been produced (e.g., after the shockwave has stopped propagating through the test specimen), thereby causing the test specimen 12 to translate along the longitudinal axis Y relative to the transducer housing 30.

The propagation of the shockwave may cause the test specimen holder 16 and the measurement assembly 18 to move relative to the transducer housing 30. For example, the test specimen holder 16, the pedestal 38, the bearing carriage 64, and the optical probe assembly 36 may translate along the first direction D₁ relative to the transducer housing 30 and the gauge housing 14. For example, the test specimen holder 16, the pedestal 38, the bearing carriage 64, and the optical probe assembly 36 may translate along the first direction D₁ from the respective initial position shown in FIG. 3A to the respective final position shown in FIG. 3B.

The optical beam may be directed from the optical probe 84 through the bearing carriage 64, the pedestal 38, and the test specimen holder 16 to the test specimen 12 while the shockwave propagates through the test specimen 12. The optical probe 84 may measure the displacement (e.g., vibration) of the test specimen 12 due to the shockwave propagating through the test specimen 12. The processor 170 may determine the prompt impulse based on the displacement of the test specimen measured by the optical probe 84 when the shockwave propagates through the test specimen 12. As discussed below with reference to FIGS. 4A and 5, the resulting data may be processed by THRee-Interferometer-VElocimetry ("THRIVE") and/or Sandia InfraRed HEtrodyne aNalysis ("SIRHEN") to provide a particle velocity of the test specimen 12 versus time.

Figure 4A:
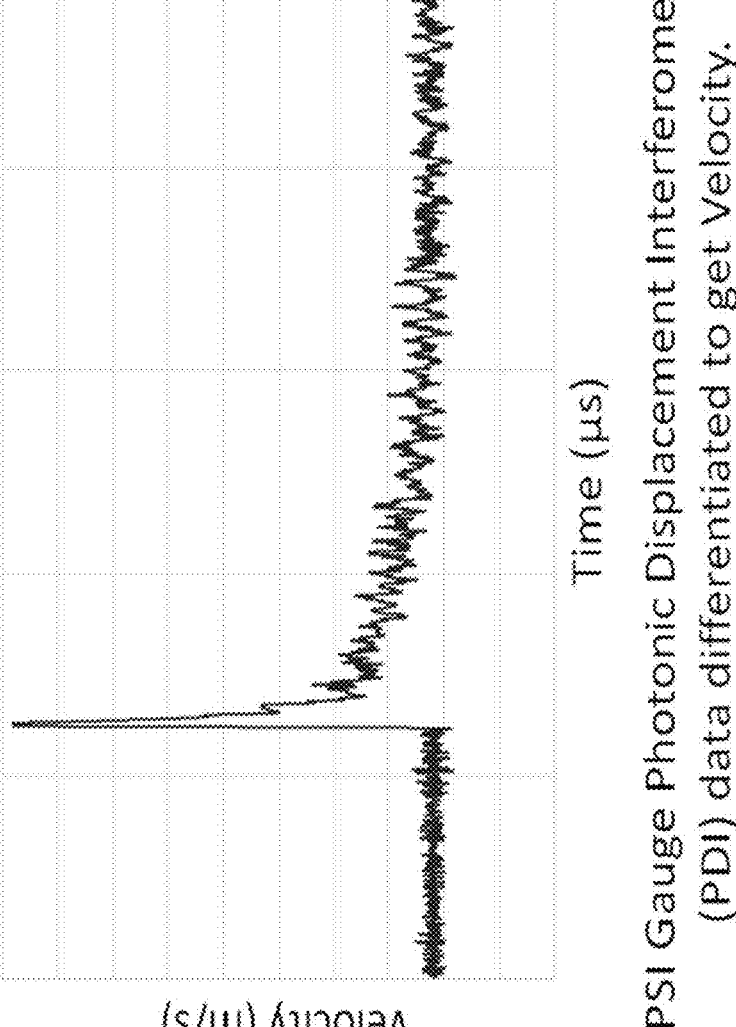
FIG. 4A is a plot representing particle velocity measured by the optical probe assembly of FIG. 2A versus time.

FIG. 4A represents a particle velocity of the test specimen 12 detected by the optical probe assembly 36 time. For example, the particle velocity in meters per second (m/s) may be represented over a span of 1 to 10 microseconds (µs), starting during or immediately after the motivating event (e.g., X-ray energy, ion energy, or direct laser energy directed at the test specimen 12). The particle velocity may be derived using photonic displacement interferometry with the optical probe assembly 36, as discussed further below with reference to FIG. 5. The prompt impulse imparted onto the test specimen may be determined based upon the particle velocity.

Figure 5:
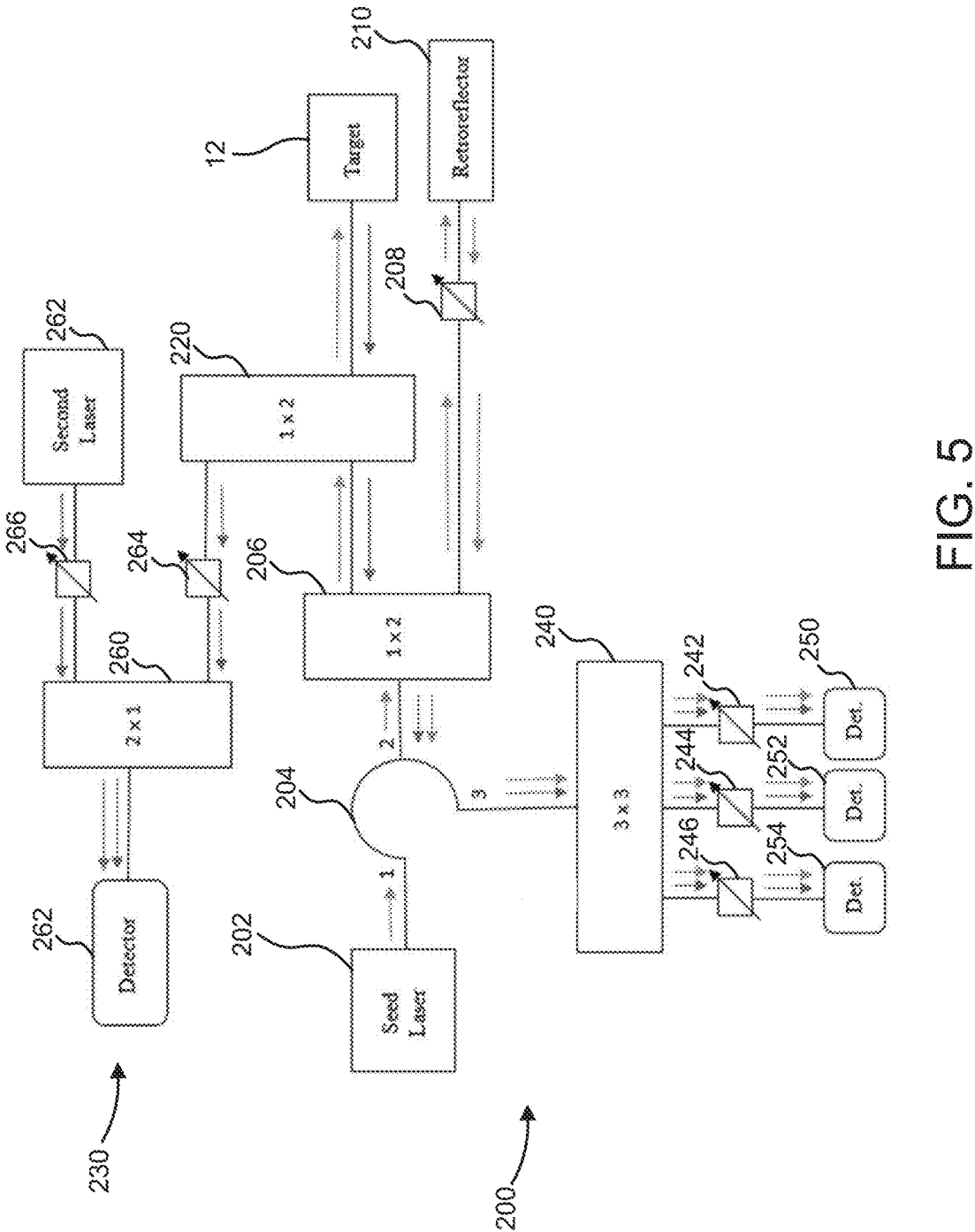
FIG. 5 is a schematic representation of a triature system and a heterodyne system, each of which may calculate the particle velocity of the test specimen due to the shockwave.

Two methods can be used to obtain determine the particle velocity from a Phase Doppler Interferometry (PDI) signal output by the optical probe assembly 36. Referring to FIG. 5, one method may use a triature hardware system 200 and THRIVE analysis software to calculate the particle velocity from the data of the PDI signal. Another method may use a heterodyne system and SIRHEN analysis software to calculate the particle velocity.

The triature hardware system 200 may include a seed laser 202 that generates a laser beam (e.g., with a 1550.12 nanometer (nm) wavelength). The laser beam may be directed to an optical circulator 204 to prevent the laser beam from returning to the seed laser 202 and causing damage.

The triature hardware system 200 may include a two-way beam splitter 206 that is configured to split the laser beam. The two-way beam splitter 206 may be configured to direct a first half of the laser beam to a target (e.g., test specimen 12). The two-way beam splitter 206 may be configured to direct the other half of the laser beam to through a light attenuator 208 to a retroreflector 210.

The first half of the laser beam may undergo a phase shift and frequency shift (Doppler shift) due to the amount of displacement and the particle velocity of the test specimen 12, respectively. The other half of the laser beam may be attenuated by the light attenuator 208 and reflected back through the light attenuator 208 by the retroreflector 210 to the two-way beam splitter 206.

A beam splitter 220 may be configured to split the first half of the laser beam that is reflected by the test specimen 12, such that one part of the reflected first half of the laser beam may be directed to the two-way beam splitter 206. The beam splitter 220 may be configured to split the reflected first half of the laser beam such that another part of the reflected first half is directed to a heterodyne system 230, as discussed further below.

The two-way beam splitter 206 may be configured to recombine the reflected first half of the laser beam with the reflected second half of the laser beam. The frequency difference between the reflected first half of the laser beam and the reflected second half of the laser beam may be small enough to be insignificant/undetected due to both originating from the same seed laser 202. Thus, the phase shift may be the dominant difference between the reflected first half and the reflected second half. The phase shift between the reflected first half and the reflected second half may create an interference pattern when recombined.

The two-way beam splitter 206 may be configured to direct the resulting recombined laser beam to the optical circulator 204. The circulator 204 may direct the recombined laser beam to a three-by-three beam splitter 240 that is configured to split the recombined laser beam into three output beams, which are each 120° out of phase with the other two output beams. For example, as described in Jones, Scott Christopher, and Dolan, Daniel H, 2008, "THRIVE: a data reduction program for three-phase PDV/PDI and VISAR measurements," available at https://doi.org/10.2172/942210 and https://www.osti.gov/servlets/purl/942210, which is incorporated by reference.

The three-by-three beam splitter 240 may be configured to output each of the three output beams to a respective detector 250, 252, or 254, via a respective attenuator 242, 244, and 246. The detectors 250, 252, and 254 may each be configured to display the interference pattern on a scope (not shown) based on the respectively received output beam of the three output beams.

The three output beams may input into THRIVE to generate the particle velocity of the test specimen 12. The particle velocity may be the velocity of the mass particles that accelerate due to the shockwave caused by the motivating event. For example, as described in Forbes, Jerry W. 2012, "Shock Wave Compression of Condensed Matter," Heidelberg: Springer, which is incorporated by reference.

Also, "THRIVE: a data reduction program for three-phase PDV/PDI and VISAR measurements" explains that THRIVE accepts three-phase interferometer measurements from either a single text file or separate text files. Users may specify a characterization time range (over which signal characterization is performed) and an experiment time range (over which the analysis is performed). The signals may be reduced in either an ideal sense or by using ellipse characterization; the latter uses ellipse fits on signal pairs D1-D2 and D1-D3 to extract information about possible imperfections in the measurement. By default, THRIVE assumes all signals are DC coupled, but AC coupled signals are also supported. The program uses a push-pull analysis to reduce three phase-shifted signals to an ideal pair of quadrature signals. With proper signal characterization, this reduction eliminates variable light conditions, imperfect phase shifts/splitting, and detector sensitivity from the measurement. The resulting fringe shift is used to calculate target position and velocity. The program utilizes SavitzkyGolay smoothing and differentiation to compensate for signal noise. Data generated by THRIVE can be exported to a text file for post-processing or saved in various graphical formats.

The other method may use the heterodyne system 230 and SIRHEN to calculate the particle velocity. For example, as described in Dolan, III, Daniel H, and Ao, Tommy, 2010, "SIRHEN: a data reduction program for photonic Doppler velocimetry measurements," available at: https://doi.org/10.2172/989357 and https://www.osti.gov/servlets/purl/989357, which is incorporated by reference.

The heterodyne system 230 may be configured to receive the another part of the reflected first half of the laser beam as discussed above. For example, a beam combiner 260 may be configured to receive the another part of the reflected first half and a second laser beam from a second laser 262, and combine such. Attenuators 264 or 266 may be configured to attenuate a respective one of the another part of the reflected first half and the second laser beam.

The second laser may be configured such that the second laser beam has a wavelength different from the another part of the reflected first half, which originates from the seed laser 202. For example, the second laser may be configured such that the second laser beam has a 1550.126 nm wavelength.

Thus, the beam combiner 260 may be configured to output a combined beam from the another part of the reflected first half and the second laser beam, which have different wavelengths. A detector 262 may be configured to receive the combined beam and output a beat frequency (i.e., a difference between frequencies of the another part of the reflected first half and the second laser beam) due to interference. For example, the detector 262 may be configured to display the beat frequency on a scope (not shown).

Due to the wavelength difference between the seed laser and second laser, a difference in frequencies between the another part of the reflected first half (which is reflected from the test specimen 12) and the second laser beam may be enough to be detected by the detector 262, such that the detector 262 outputs the beat frequency. Thus, the difference in frequencies may be the dominant variance between the two beams instead of the phase shift as in the triature hardware system 200.

The output of the detector 262 may be input to SIRHEN to generate the corresponding particle velocity data. For example, as described in "SIRHEN: a data reduction program for photonic Doppler velocimetry measurements."

"SIRHEN: a data reduction program for photonic Doppler velocimetry measurements" explains that the SIRHEN program may reduce a photonic Doppler velocimetry (PDV) signal into a velocity history. For example, SIRHEN accepts a single data file in either text or binary format. Users of SIRHEN may specify a reference time range (over which an underlying beat frequency is characterized) and an experiment range (over which the analysis is performed). SIRHEN may use short-time Fourier transform analysis to generate the frequency spectrum of the PDV signal. A velocity history may be extracted from the frequency spectrum using a peak finding method. Data generated by SIRHEN can then be exported to a text file for post-processing (or saved in various graphical formats).

The movement of the test specimen 12 may cause the magnets 34 (FIG. 2A) to produce a voltage with the coil assembly 32. The voltage may be based on the translational movement of the pedestal 28 in the first direction $D_1$ relative to the transducer housing 30 in response to the motivating event, after the shockwave has propagated through the test specimen 12. The processor 170 may determine the total impulse based on a velocity of the test specimen and mass of the test specimen 12. For example, the velocity may be determined based on the voltage produced by the electromagnetic transducer when the test specimen 12 translates rearward along the longitudinal axis Y. A voltage to velocity conversion factor may be determined by calibrating the gauge 10 to develop a voltage to velocity correlation, which may be stored in the memory 172.

Figure 4B:
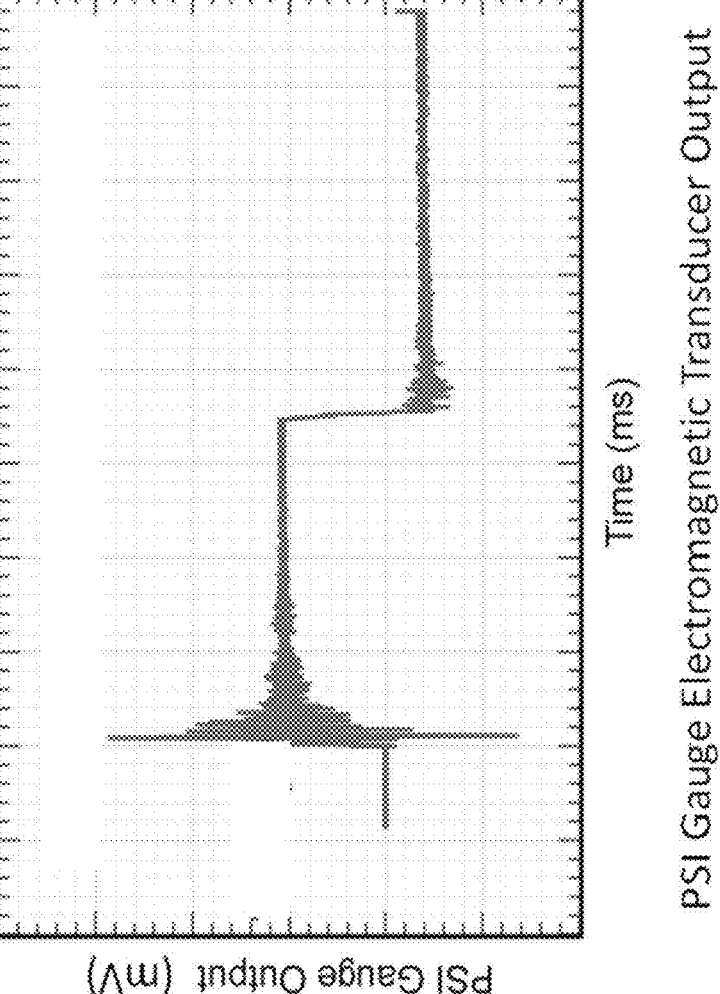
FIG. 4B is a plot representing voltage measured by the electromagnetic transducer FIG. 2A versus time.

FIG. 4B represents a measurement of voltage produced by the electromagnetic transducer versus time. For example, the measured output in millivolts (mV) output by the electromagnetic transducer per millisecond (ms), when the test specimen 12 translates rearward with the specimen holder 16 (e.g., when the magnets 34 pass through the coil assembly 32) from an applied impulse load. The voltage output may be measured over a span of over 10 milliseconds, which may begin after the shockwave has already propagated through the test specimen 12.

The output data plotted in FIG. 4B may be correlated with calibration data for the gauge 10 to determine the total impulse imparted to test specimen 12.

The following are a number of nonlimiting EXAMPLES of aspects of the disclosure.

In one general aspect, an apparatus for measuring movement of through a test specimen may include a transducer housing. The apparatus may also include a test specimen holder that is configured to hold the test specimen and configured to move relative to the transducer housing when the test specimen moves relative to the transducer housing. The apparatus may also include a body that is fixed relative to the test specimen holder such that the body moves with the test specimen holder, relative to the transducer housing, when the test specimen translates relative to the transducer housing. The apparatus may also include an electromagnetic transducer configured to produce a voltage when the test specimen holder and the body move relative to the transducer housing. The apparatus may also include an optical probe configured to direct an optical beam through the body to the test specimen. Other embodiments of this aspect include corresponding computer systems, apparatus, and computer programs recorded on one or more computer storage devices, each configured to perform the actions of the methods.

Implementations may include one or more of the following features. The apparatus where the electromagnetic transducer comprises one or more transducer bearings that are coupled to the body such that the one or more transducer bearings move with the body when the test specimen holder and the body move relative to the transducer housing. The apparatus where the electromagnetic transducer comprises a coil winding and a magnet configured to induce a current through the coil winding, thereby producing the voltage, when the test specimen holder and the body move relative to the transducer housing. The apparatus where the magnet is coupled to the body such that movement of the body moves the magnet relative to the coil winding. The apparatus where the test specimen holder is configured to move in a first direction relative to the transducer housing, and wherein the electromagnetic transducer is configured produce the voltage when the test specimen holder and the body move in the first direction relative to the transducer housing. The apparatus where the optical probe is configured to move relative to the transducer housing with the body and the test specimen holder. The apparatus where the optical beam is a laser beam. The apparatus may include an optical probe adjuster configured to adjust focus and/or tip tilt of the optical probe. The apparatus may include the test specimen. The apparatus where the test specimen holder and/or the body include an opening for the optical beam to travel through the body to reach the test specimen. The apparatus where the body forms at least a portion of the test specimen holder. The apparatus where the test specimen holder further comprises a window that is configured such that the optical beam passes through the window to reach the test specimen. The apparatus where the body forms a pedestal that is coupled to the test specimen holder. The apparatus where the test specimen holder is disposed entirely outside of the transducer housing. The apparatus may include a gauge housing that circumscribes at least a portion of the transducer housing. The apparatus may include a shock isolation system configured to shock isolate the gauge housing from the test specimen holder and the body. The apparatus where the shock isolation system comprises a shock isolation weight that is fixed to the transducer housing, and a pair of linear bearings that are separated by a dampening element. The apparatus may include a processor operably coupled to the optical probe and the electromagnetic transducer. The apparatus where the processor is configured to determine prompt impulse based on a displacement of the test specimen measured by the optical probe when the shockwave propagates through the test specimen. The apparatus where the processor is configured to determine total impulse based on a velocity of the test specimen determined based on the voltage produced by the electromagnetic transducer when the test specimen translates relative to the transducer housing. A system comprising the apparatus and an X-ray generator, an ion generator, or a laser generator configured to direct an X-ray, ion, or laser to the test specimen. A method of operating the apparatus having: producing the shockwave that propagates through the test specimen such that the test specimen is displaced relative to the transducer housing and such displacement is detected by the optical probe. The method may include determining, with a processor a prompt impulse based on the displacement of the test specimen measured by the optical probe when the shockwave propagates through the test specimen; and a total impulse based on a velocity of the test specimen determined based on the voltage produced by the electromagnetic transducer when the test specimen translates relative to the transducer housing. The method where the total impulse is determined based on the velocity and a mass of the test specimen. Implementations of the described techniques may include hardware, a method or process, or a computer tangible medium.

In one general aspect, a method of measuring movement of a test specimen may include holding test specimen in a test specimen holder. The method may also include directing an optical beam from an optical probe through a body, that is fixed relative to the test specimen holder, to the test specimen. The method may also include producing a shockwave that propagates through the test specimen such that the optical probe measures the displacement of the test specimen due to the shockwave. The method may also include producing a voltage with an electromagnetic transducer based on movement of the body with the test specimen in a first direction relative to the transducer housing. Other embodiments of this aspect include corresponding computer systems, apparatus, and computer programs recorded on one or more computer storage devices, each configured to perform the actions of the methods.

Implementations may include one or more of the following features. The method where the optical beam is directed to the test specimen while the shockwave propagates through the test specimen, which occurs before the voltage is produced by the electromagnetic transducer. The method may include moving one or more transducer bearings with the body when the specimen holder and the body move in a first direction due to a motivating event that urges the test specimen in the first direction. The method may include moving a magnet, of the electromagnetic transducer, in the first direction with the body relative to a coil winding of the electromagnetic transducer, thereby inducing a current through the coil winding to produce the voltage. The method may include moving the optical probe in the first direction with the test specimen holder and the body. The method where the shockwave propagates through the test specimen for 1 to 10 microseconds, and the electromagnetic transducer produces the voltage for 1 to 10 milliseconds. The method may include moving the transducer housing along one or more liner bearings in the first direction due to a motivating event acting on the test specimen. The method may include adjusting a focus and/or tip tilt of the optical probe to target the test specimen. The method may include measuring, with the optical probe, a displacement of the test specimen due to the shockwave, and determining a prompt impulse, with a processor, based on the displacement of the test specimen measured by the optical probe. The method may include measuring, with an electromagnetic transducer, a velocity of the test specimen due to a motivating event, and determining a total impulse, with a processor, based on the velocity the test specimen measured by the electromagnetic transducer. The method may include directing an X-ray, ion, or laser for 1 to 10 microseconds to the test specimen from an X-ray generator, an ion generator, or a laser generator, such that the shockwave propagates through the test specimen; and continuing to direct the X-ray, ion, or laser to the test specimen for 1 to 10 milliseconds, such that the test specimen translates in the first direction. Implementations of the described techniques may include hardware, a method or process, or a computer tangible medium.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

Although the disclosure has been described in detail, it should be understood that various changes, substitutions, and alterations can be made herein without departing from the spirit and scope of the present disclosure as defined by the appended claims. Additionally, any of the embodiments disclosed herein can incorporate features disclosed with respect to any of the other embodiments disclosed herein. Moreover, the scope of the present disclosure is not intended to be limited to the particular embodiments described in the specification. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed is:

1. An apparatus for measuring movement of a test specimen, the apparatus comprising:
   a transducer housing;
   a test specimen holder that is configured to hold the test specimen and configured to move relative to the transducer housing when the test specimen moves relative to the transducer housing;
   a body that is fixed relative to the test specimen holder such that the body moves with the test specimen holder, relative to the transducer housing, when the test specimen translates relative to the transducer housing;
   an electromagnetic transducer configured to produce a voltage when the test specimen holder and the body move relative to the transducer housing; and
   an optical probe configured to direct an optical beam through the body to the test specimen.

2. The apparatus of claim 1, wherein the electromagnetic transducer comprises one or more transducer bearings that are coupled to the body such that the one or more transducer bearings move with the body when the test specimen holder and the body move relative to the transducer housing.

3. The apparatus of claim 1, wherein the electromagnetic transducer comprises a coil winding and a magnet configured to induce a current through the coil winding, thereby producing the voltage, when the test specimen holder and the body move relative to the transducer housing.

4. The apparatus of claim 1, wherein the test specimen holder is configured to move in a first direction relative to the transducer housing, and wherein the electromagnetic transducer is configured produce the voltage when the test specimen holder and the body move in the first direction relative to the transducer housing.

5. The apparatus of claim 1, wherein the optical probe is configured to move relative to the transducer housing with the body and the test specimen holder.

6. The apparatus of claim 1, further comprising an optical probe adjuster configured to adjust focus and/or tip tilt of the optical probe.

7. The apparatus of claim 1, further comprising the test specimen.

8. The apparatus of claim 1, wherein the test specimen holder further comprises a window that is configured such that the optical beam passes through the window to reach the test specimen.

9. The apparatus of claim 1, further comprising a shock isolation system configured to shock isolate a gauge housing, that circumscribes at least a portion of the transducer housing, from the test specimen holder and the body.

10. The apparatus of claim 1, further comprising a processor operably coupled to the optical probe and the electromagnetic transducer, wherein the processor is configured to:
   determine prompt impulse based on a displacement of the test specimen measured by the optical probe when a shockwave propagates through the test specimen; and
   determine total impulse based on a velocity of the test specimen determined based on the voltage produced by the electromagnetic transducer when the test specimen translates relative to the transducer housing.

11. A system comprising:

the apparatus of claim 1; and an X-ray generator, an ion generator, or a laser generator configured to direct an X-ray, ion, or laser to the test specimen.

12. A method of operating the apparatus of claim 1 comprising producing a shockwave that propagates through the test specimen such that the test specimen is displaced relative to the transducer housing and such displacement is detected by the optical probe.

13. A method of measuring movement of a test specimen, the method comprising:

holding test specimen in a test specimen holder;

directing an optical beam from an optical probe through a body, that is fixed relative to the test specimen holder, to the test specimen;

producing a shockwave that propagates through the test specimen such that the optical probe measures displacement of the test specimen due to the shockwave; and producing a voltage with an electromagnetic transducer based on movement of the body with the test specimen in a first direction relative to the transducer housing.

14. The method of claim 13, wherein the optical beam is directed to the test specimen while the shockwave propagates through the test specimen, which occurs before the voltage is produced by the electromagnetic transducer.

15. The method of claim 13, further comprising moving one or more transducer bearings with the body when the specimen holder and the body move in a first direction due to a motivating event that urges the test specimen in the first direction.

16. The method of claim 13, further comprising moving a magnet, of the electromagnetic transducer, in the first direction with the body relative to a coil winding of the electromagnetic transducer, thereby inducing a current through the coil winding to produce the voltage.

17. The method of claim 13, further comprising moving the optical probe in the first direction with the test specimen holder and the body.

18. The method of claim 13, wherein the shockwave propagates through the test specimen for 1 to 10 microseconds, and the electromagnetic transducer produces the voltage for 1 to 10 milliseconds.

19. The method of claim 13, further comprising:

measuring, with the optical probe, a displacement of the test specimen due to the shockwave;

determining a prompt impulse, with a processor, based on the displacement of the test specimen measured by the optical probe;

measuring, with an electromagnetic transducer, a velocity of the test specimen due to a motivating event; and determining a total impulse, with a processor, based on the velocity the test specimen measured by the electromagnetic transducer.

20. The method of claim 13, further comprising directing an X-ray, ion, or laser for 1 to 10 microseconds to the test specimen from an X-ray generator, an ion generator, or a laser generator, such that the shockwave propagates through the test specimen; and continuing to direct the X-ray, ion, or laser to the test specimen for 1 to 10 milliseconds, such that the test specimen translates in the first direction.

* * * * *